(12) United States Patent
Kawanaka

(10) Patent No.: US 12,159,625 B2
(45) Date of Patent: Dec. 3, 2024

(54) INFORMATION PROCESSING APPARATUS FOR SELECTING SET VALUE USED TO EXECUTE FUNCTION

(71) Applicant: KYOCERA Document Solutions Inc., Osaka (JP)

(72) Inventor: Kohei Kawanaka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 332 days.

(21) Appl. No.: 17/707,372

(22) Filed: Mar. 29, 2022

(65) Prior Publication Data

US 2022/0328036 A1   Oct. 13, 2022

(30) Foreign Application Priority Data

Apr. 8, 2021 (JP) ................. 2021-065616

(51) Int. Cl.
| | |
|---|---|
| *G10L 15/10* | (2006.01) |
| *G10L 15/02* | (2006.01) |
| *G10L 15/22* | (2006.01) |
| *H04N 1/00* | (2006.01) |

(52) U.S. Cl.
CPC .............. *G10L 15/10* (2013.01); *G10L 15/02* (2013.01); *G10L 15/22* (2013.01); *H04N 1/00403* (2013.01); *G10L 2015/025* (2013.01)

(58) Field of Classification Search
CPC ......... G10L 15/10; G10L 15/02; G10L 15/22; G10L 2015/025; G10L 2015/223; G10L 2015/226; H04N 1/00403
See application file for complete search history.

(56) References Cited

U.S. PATENT DOCUMENTS

| | | | |
|---|---|---|---|
| 2014/0310001 A1* | 10/2014 | Kalns ................ | G10L 15/30 704/270.1 |
| 2015/0331665 A1 | 11/2015 | Ishii et al. | |
| 2017/0372200 A1* | 12/2017 | Chen ................. | G06N 3/044 |

(Continued)

FOREIGN PATENT DOCUMENTS

| | | |
|---|---|---|
| JP | 2019056913 A | 4/2019 |
| WO | 2020026799 A1 | 2/2020 |

*Primary Examiner* — Douglas Godbold
(74) *Attorney, Agent, or Firm* — IP Business Solutions, LLC.

(57) ABSTRACT

The processor of an information processing apparatus includes serves, by executing an information processing program, as: a function determiner; a morpheme analyzer configured to analyze a message input by a user in morphemes; a word detector configured to detect a predetermined time-representing word indicating temporal nearness or farness and a predetermined keyword which is modified by the time-representing word and which indicates settings associated with the function from the message analyzed in morphemes by the morpheme analyzer; a setting selector configured to select a newest set value when the word detector has detected the time-representing word indicating temporal nearness and to select a set value used when the user used the function in the past when the word detector has detected the time-representing word indicating temporal farness; and a function executor configured to execute the function determined by the function determiner using the set value selected by the setting selector.

2 Claims, 5 Drawing Sheets

(56) References Cited

U.S. PATENT DOCUMENTS

2018/0232201 A1* 8/2018 Holtmann ............... G10L 17/04
2019/0122181 A1* 4/2019 Maeda ............... G06Q 10/1095
2021/0065705 A1* 3/2021 Ham ....................... G10L 15/02
2021/0295836 A1* 9/2021 Iwase ...................... G10L 15/22

* cited by examiner

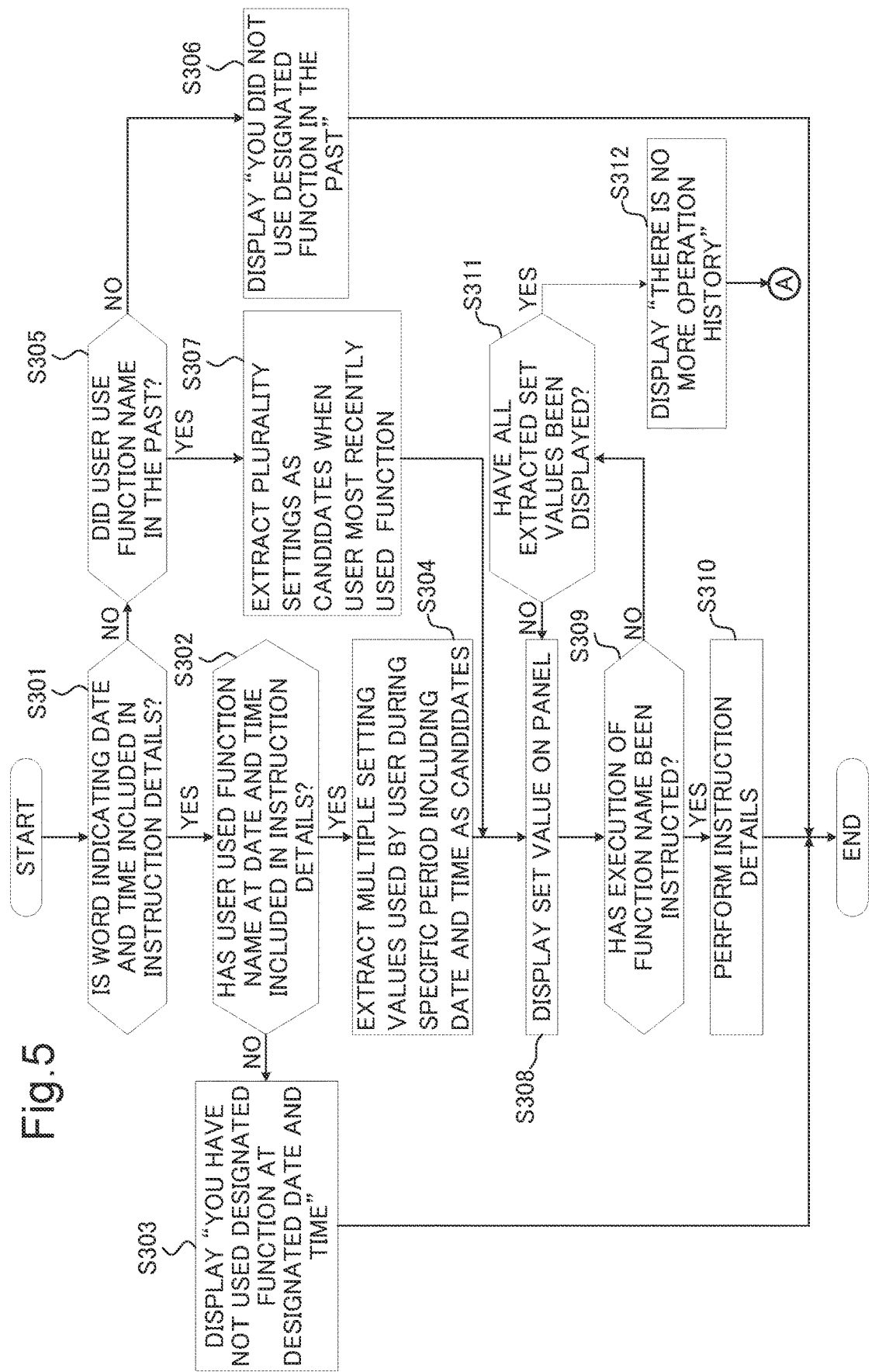

INFORMATION PROCESSING APPARATUS FOR SELECTING SET VALUE USED TO EXECUTE FUNCTION

INCORPORATION BY REFERENCE

This application claims priority to Japanese Patent Application No. 2021-065616 filed on Apr. 8, 2021, the entire contents of which are incorporated by reference herein.

BACKGROUND

The present disclosure relates to an information processing device, an information processing method, and an information processing program for executing a function using a variable set value.

An information processing apparatus, for example, an image forming apparatus, can execute a function (for example, a copy function or a scanner function) using a variable set value (for example, color settings such as full color or gray-scale). An image forming apparatus that enables a user to designate a set value or a function by voice input has been proposed.

SUMMARY

An aspect of the present disclosure provides an improvement of the aforementioned technique.

An information processing apparatus according to an aspect of the present disclosure includes a processor. The processor serves as a function determiner, a morpheme analyzer, a word detector, and a function executor by executing an information processing program. The function determiner is configured to determine a function to be executed. The morpheme analyzer is configured to analyze a message input by a user in morphemes. The word detector is configured to detect a predetermined time-representing word indicating temporal nearness or farness and a predetermined keyword which is modified by the time-representing word and which indicates settings associated with the function from the message analyzed in morphemes by the morpheme analyzer. The setting selector is configured to select a newest set value when the word detector has detected the time-representing word indicating temporal nearness and to select a set value used when the user used the function in the past when the word detector has detected the time-representing word indicating temporal farness. The function executor is configured to execute the function determined by the function determiner using the set value selected by the setting selector.

An information processing method according to an aspect of the present disclosure includes: determining a function to be executed; analyzing a message input by a user in morphemes; detecting a predetermined time-representing word indicating temporal nearness or farness and a predetermined keyword which is modified by the time-representing word and which indicates settings associated with the function from the message analyzed in morphemes; selecting a newest set value when the time-representing word indicating temporal nearness has been detected; selecting a set value used when the user used the function in the past when the time-representing word indicating temporal farness has been detected; and executing the function using the selected set value.

A non-transitory computer-readable recording medium according to an aspect of the present disclosure is a non-transitory computer-readable recording medium storing an information processing program. The information processing program causes a processor of an information processing apparatus to serve as: the function determiner, the morpheme analyzer, the word detector, the setting selector, and the function executor.

BRIEF DESCRIPTION OF THE DRAWINGS

FIG. 5 is a flowchart illustrating a third operation flow of the image forming apparatus.

DETAILED DESCRIPTION

Hereinafter, an information processing apparatus, an information processing method, an information processing program, and a non-transitory computer-readable recording medium storing the information processing program according to an aspect of the present disclosure will be described with reference to the accompanying drawings.

1. CONFIGURATION OF IMAGE FORMING APPARATUS

Figure 1:
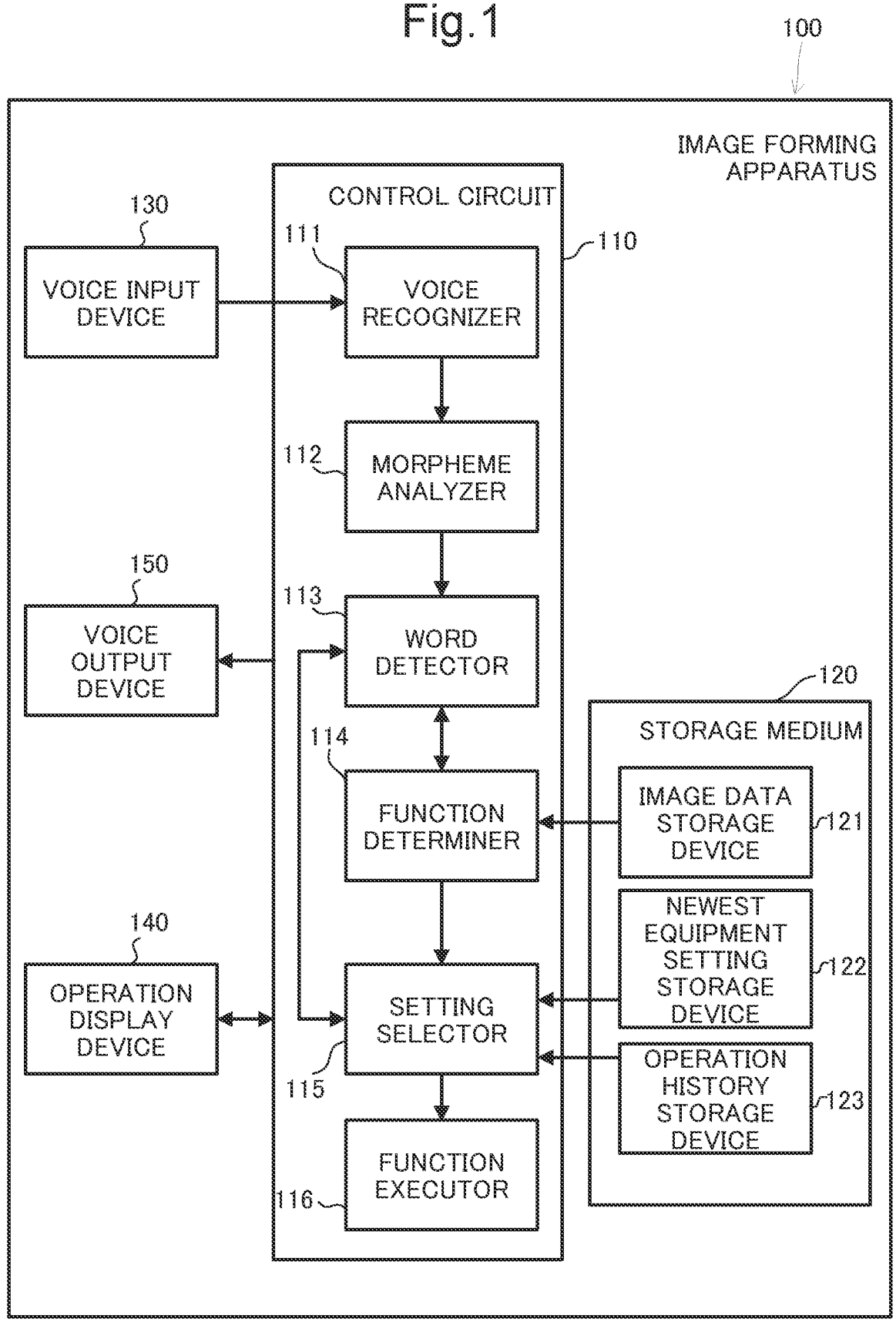
FIG. 1 is a diagram illustrating a configuration of an image forming apparatus according to an embodiment of the present disclosure.

FIG. 1 is a diagram illustrating a configuration of an image forming apparatus according to an embodiment of the present disclosure.

In this embodiment, for example, the information processing apparatus is assumed to be an image forming apparatus 100. The image forming apparatus 100 is, for example, a multi-function peripheral (MFP). The information processing apparatus is not limited to an image forming apparatus as long as it is an apparatus executing functions using variable set values.

A control circuit 110 of the image forming apparatus 100 includes a processor, a random access memory (RAM), a read only memory (ROM), and a dedicated hardware circuit. The processor is, for example, a central processing unit (CPU), an application-specific integrated circuit (ASIC), or a micro processing unit (MPU). The processor of the control circuit 110 serves as a voice recognizer 111, a morpheme analyzer 112, a word detector 113, a function selector 114, a setting selector 115, and a function executor 116 by loading an information processing program stored in the ROM or a storage medium 120 to the RAM and executing the loaded information processing program. The image forming apparatus 100 includes an image data storage device 121, a newest equipment setting storage device 122, and an operation history storage device 123 which are set, for example, as parts of a storage area in a large-scale nonvolatile storage medium 120 such as a hard disk drive (HDD) or a solid state drive (SSD). The image forming apparatus 100 includes a voice input device 130 such as a microphone, an operation display device 140 such as a touch panel or hardware keys, and a voice output device 150 such as a speaker. The image forming apparatus 100 includes an image scanner 160 that executes a scanner function and a printing device 170 that executes a copy function (none of which are illustrated).

The printing device 170 serves to form an image on a recording sheet and includes, for example, an image forming device for each color, an intermediate transfer belt, a secondary transfer roller, and a fixing device. In each image forming device, a surface of a photosensitive drum is uniformly charged, the surface of the photosensitive drum is exposed to light to form an electrostatic latent image on the surface of the photosensitive drum, the electrostatic latent image on the surface of the photosensitive drum is developed into a toner image, and the toner image on the surface of the photosensitive drum is primarily transferred to the intermediate transfer belt. Accordingly, the toner image of each color is formed on the intermediate transfer belt. The toner image of each color is secondarily transferred to a recording sheet in a nip area between the intermediate transfer belt and the secondary transfer roller. Thereafter, the recording sheet is heated and pressurized by the fixing device, the toner image on the recording sheet is fixed by thermal compression, and the recording sheet is discharged to a discharge tray via a discharge roller.

2. OPERATION FLOW OF IMAGE FORMING APPARATUS

Figure 2:
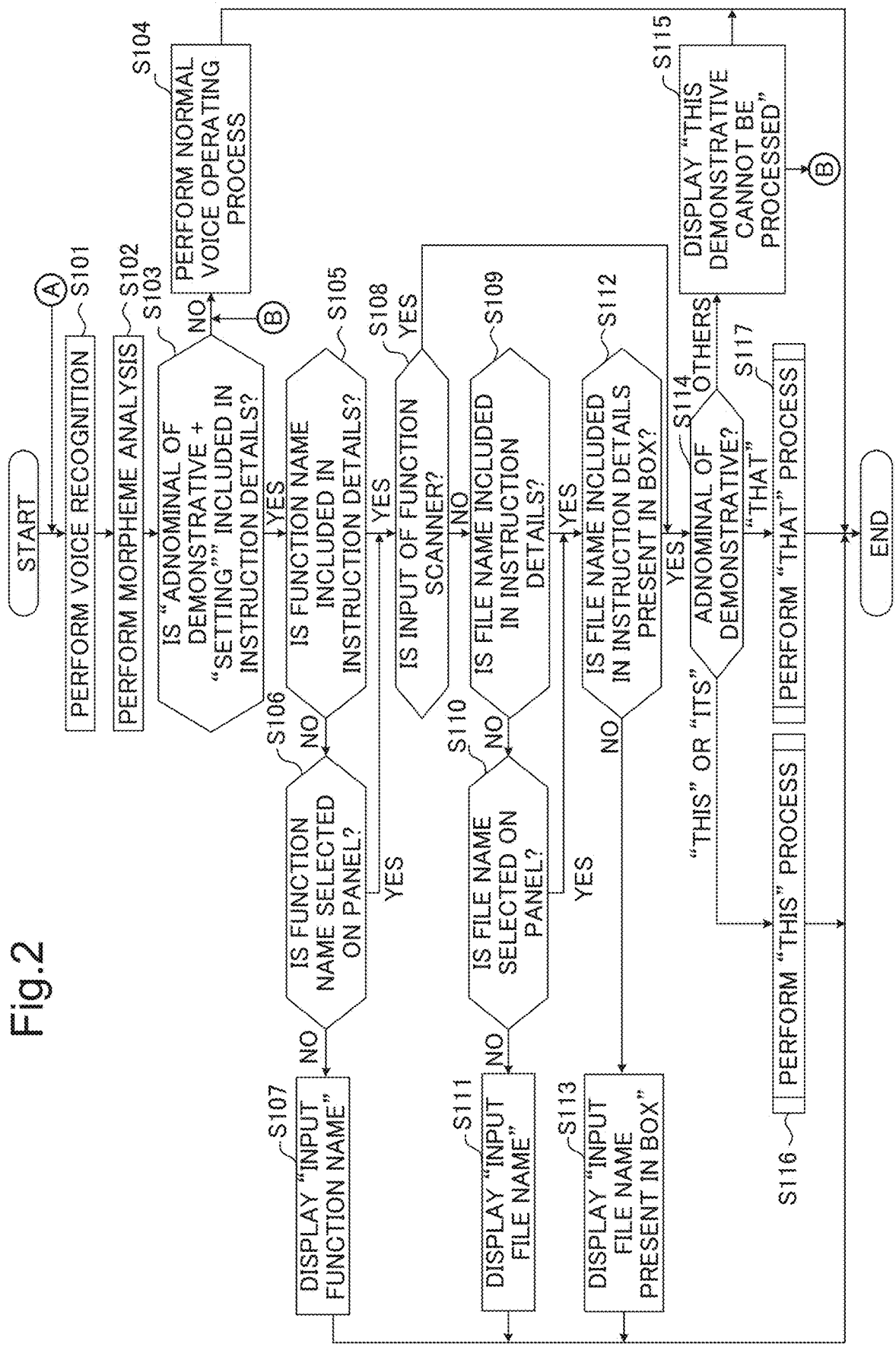
FIG. 2 is a flowchart illustrating a first operation flow of the image forming apparatus.

FIG. 2 is a flowchart illustrating a first operation flow (a main routine) which is performed by the image forming apparatus.

The voice recognizer 111 recognizes a message which is input as voice by a user via the voice input device 130 (Step S101). For example, the voice recognizer 111 recognizes a voice-input message "Copy ABC.doc using this setting." The voice recognizer 111 recognizes the message by converting the message "Copy ABC.doc using this setting," which is voice data, to text data using an existing voice recognition technique.

In Step S102, the morpheme analyzer 112 analyzes the message input by the user in morphemes. For example, the morpheme analyzer 112 analyzes the message "Copy ABC.doc using this setting" input by the user in morphemes and morphologically decomposes the message into "Copy/ABC.doc/using/this/setting" (Step S102).

Subsequently, the word detector 113 detects a predetermined word (a time representing word) indicating temporal nearness or farness and a predetermined keyword indicating settings associated with a function (for example, a scanner function) modified by the time-representing word from the message analyzed in morphemes (Step S103). The time-representing word is, for example, an adnominal demonstrative. The adnominal demonstrative is, for example, "this," "its," "that," or "what." Among these, it is assumed that "this" and "its" are predetermined time-representing words indicating temporal nearness, "that" is a predetermined time-representing word indicating temporal farness, and "what" does not correspond to either. An example of the predetermined keyword indicating settings is "setting." In this example, the word detector 113 detects the time-representing word "this" and the keyword "setting" from the message analyzed in morphemes "Copy/ABC.doc/using/this/setting" (YES in Step S103).

The time-representing word is not limited to an adnominal demonstrative and may be any word that indicates temporal nearness or farness and which is naturally uttered by a user. The keyword is not limited to "setting" and may be any word that indicates settings and which is naturally uttered by a user.

On the other hand, when the word detector 113 has not detected a time-representing word and a keyword which are consecutive (NO in Step S103), the image forming apparatus 100 performs a normal voice operating process (Step S104). For example, when the message is "Copy ABC.doc," the word detector 113 does not detect a time-representing word and a keyword which are consecutive, and thus subsequent processes are not performed and the operation flow ends.

When the determination result of Step S103 is YES, the word detector 113 detects a function name from the message analyzed in morphemes (Step S105). A function name is a name of a function to be executed by the image forming apparatus 100 (for example, a scanner function or a copy function), for example, a word such as "scan" or "copy." In this example, the word detector 113 detects the function name "copy" from the message analyzed in morphemes "Copy/ABC.doc/using/this/setting" (YES in Step S105). In this example, the function selector 114 selects the function indicated by the function name "copy" detected by the word detector 113, that is, a copy function, as a function to be executed.

On the other hand, for example, when the message is "Output ABC.doc using this setting," the word detector 113 does not detect the function name (NO in Step S105). In this case, the function selector 114 determines whether a function name is input to the operation display device 140 (the touch panel) by a user (Step S106). When it is determined that a function name is input to the operation display device 140, the function selector 114 selects the function indicated by the input function name as a function to be executed (YES in Step S106). On the other hand, when it is determined that a function name is not input to the operation display device 140 (NO in Step S106), the function selector 114 displays a message such as "input a function name" on the operation display device 140 or outputs the message by voice from the voice output device 150 (Step S107).

When the function to be executed (the copy function in this example) is selected (YES in Step S105 or S106), the function selector 114 determines whether an input for executing the copy function (that is, an input of original data which is a copy source) is a scanner (Step S108). For example, when a sheet sensor provided in the scanner outputs that original data is mounted on the scanner, the function selector 114 determines that the input for executing the function is a scanner (YES in Step S108).

A routine when the function selector 114 determines that the input for executing the copy function is not a scanner (NO in Step S108) will be described below. For example, when original data is not mounted on the scanner, the function selector 114 determines that the input for executing the copy function is not a scanner. When the word detector 113 detects a function name "user box copy" from the message analyzed in morphemes, the function selector 114 determines that the function to be executed is a user box copy. For example, it is assumed that the message is "Copy ABC.doc in the user box using this setting." In this case, since the word detector 113 detects the function name "user box copy" from the message analyzed in morphemes "Copy/ABC.doc/in the user box/using/this/setting," the function selector 114 determines that the function to be executed is the user box copy. The "user box copy" is a function of copying a file stored in a user box which is a storage area for each logged-in user in the image data storage device 121.

In this case (NO in Step S108), the word detector 113 detects a file name from the message analyzed in morphemes (Step S109). For example, it is assumed that the message is "Copy ABC.doc in the user box using this setting." In this case, the word detector 113 detects the file name "ABC.com" from the message analyzed in morphemes "Copy/ABC.doc/in the user box/using/this/setting" (YES in Step S109). The function selector 114 selects the file name "ABC.com" detected by the word detector 113 as a file name of a file on which the copy function is to be executed.

On the other hand, for example, it is assumed that the message is "Copy from the user box using this setting." In this case, when the word detector 113 does not detect a file name from the message analyzed in morphemes "Copy/from the user box/using/this/setting" (NO in Step S109), the function selector 114 determines whether a file name is input to the operation display device 140 (the touch panel) by a user (Step S110). When it is determined that a file name is input to the operation display device 140, the function selector 114 selects a file indicated by the input file name as a file on which the copy function is to be executed (YES in Step S110). On the other hand, when it is determined that a file name is not input to the operation display device 140 (NO in Step S110), the function selector 114 displays a message such as "input a file name" on the operation display device 140 or outputs the message by voice from the voice output device 150 (Step S111).

When a file name of a file on which the copy function is to be executed is detected (YES in Step S109 or S110), the function selector 114 determines whether the file identified by the detected file name is stored in the user box in the image data storage device 121 (Step S112). In this example, the function selector 114 determines whether a file identified by the file name "ABC.com" is stored in the user box in the image data storage device 121.

When it is determined that a file identified by the file name "ABC.com" is not stored in the user box in the image data storage device 121 (NO in Step S112), the function selector 114 displays a message such as "input the name of a file in the user box" on the operation display device 140 or outputs the message by voice from the voice output device 150 (Step S113).

When the function to be executed is the copy function and the input is a scanner (YES in Step S108), or when a file on which the function to be executed is the user box copy is stored in the user box in the image data storage device 121 (YES in Step S112), the image forming apparatus 100 can execute the function. In this case, the setting selector 115 determines a variable set value for executing the function.

The setting selector 115 determines whether the detected time-representing word (Step S103) is a time-representing word indicating temporal nearness, a time-representing word indicating temporal farness, or neither (Step S114). As described above, the time-representing word is, for example, an adnominal demonstrative. The adnominal demonstrative is, for example, "this," "its," "that," or "what." Among these, "this" and "its" are time-representing words indicating temporal nearness, "that" is a time-representing word indicating temporal farness, and "what" does not correspond to either. When "what" is detected, the setting selector 115 displays, for example, a message "It is a demonstrative which cannot be processed" on the operation display device 140 (Step S115), and the routine proceeds to the normal voice operating process (Step S104). For example, when the message is "Copy ABC.com using what setting," "what" is not a time-representing word indicating temporal nearness or farness and thus the setting selector 115 does not perform subsequent processes and ends the routine. In a modified example, at a time point at which "what" is first detected by the word detector 113 (NO in Step S103), the image forming apparatus 100 may perform the normal voice operating process (Step S104).

On the other hand, the setting selector 115 determines a variable set value used to execute a function using different methods when the time-representing word "this" or "its" indicating temporal nearness is detected (Step S116) and when the time-representing word "that" indicating temporal farness is detected (Step S117).

Figure 3:
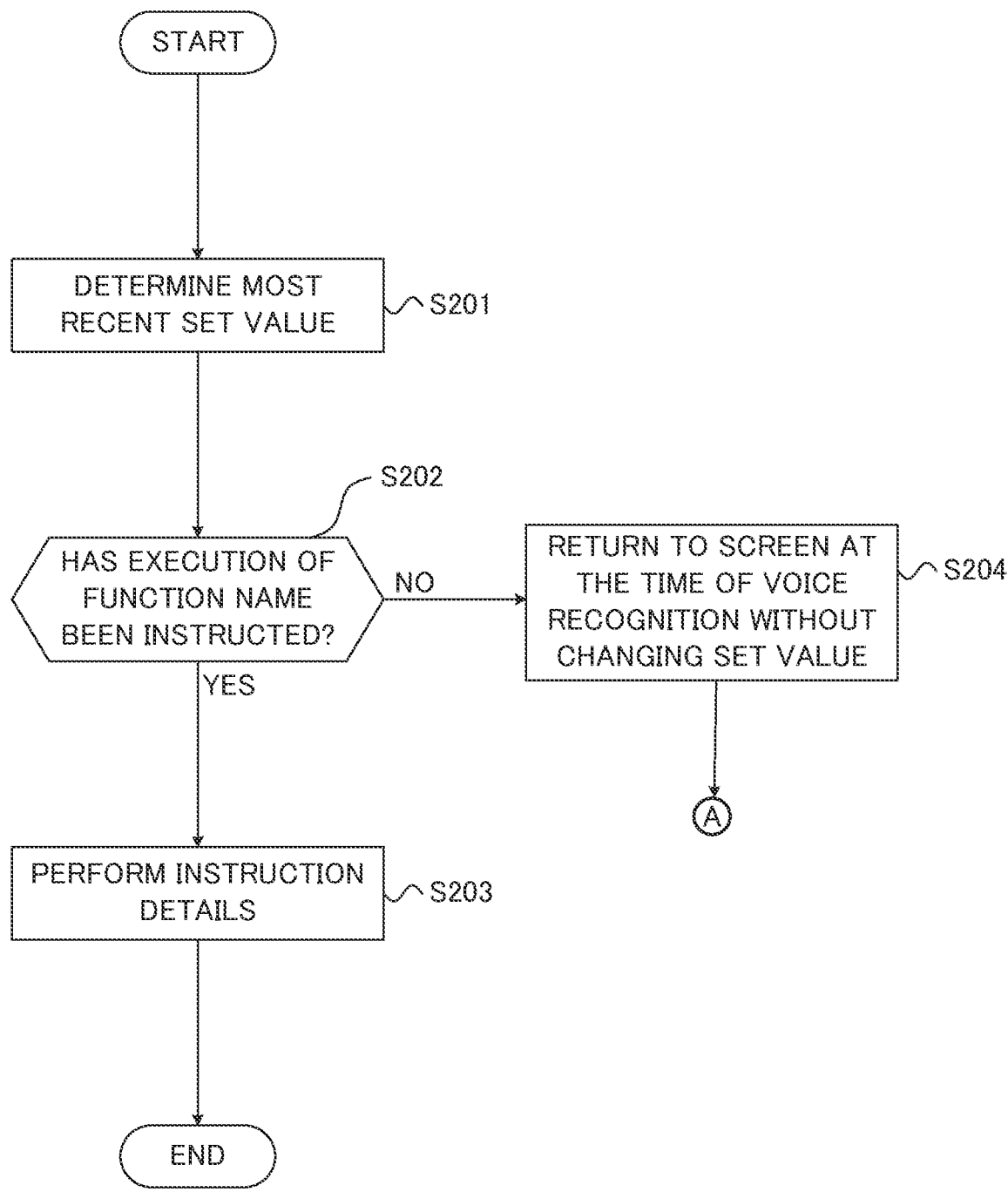
FIG. 3 is a flowchart illustrating a second operation flow of the image forming apparatus.

FIG. 3 illustrates a second operation flow (a routine when a time-representing word indicating temporal nearness is detected) in the image forming apparatus.

First, an operation of the setting selector 115 when the time-representing word "this" or "its" indicating temporal nearness is detected (Step S116) will be described.

The setting selector 115 determines a newest (that is, most recent) set value set for the function to be executed and stored in the newest equipment setting storage device 122 (Step S201). The setting selector 115 displays the newest set value as a graphical user interface (GUI) on the operation display device 140 (the touch panel).

Figure 4:
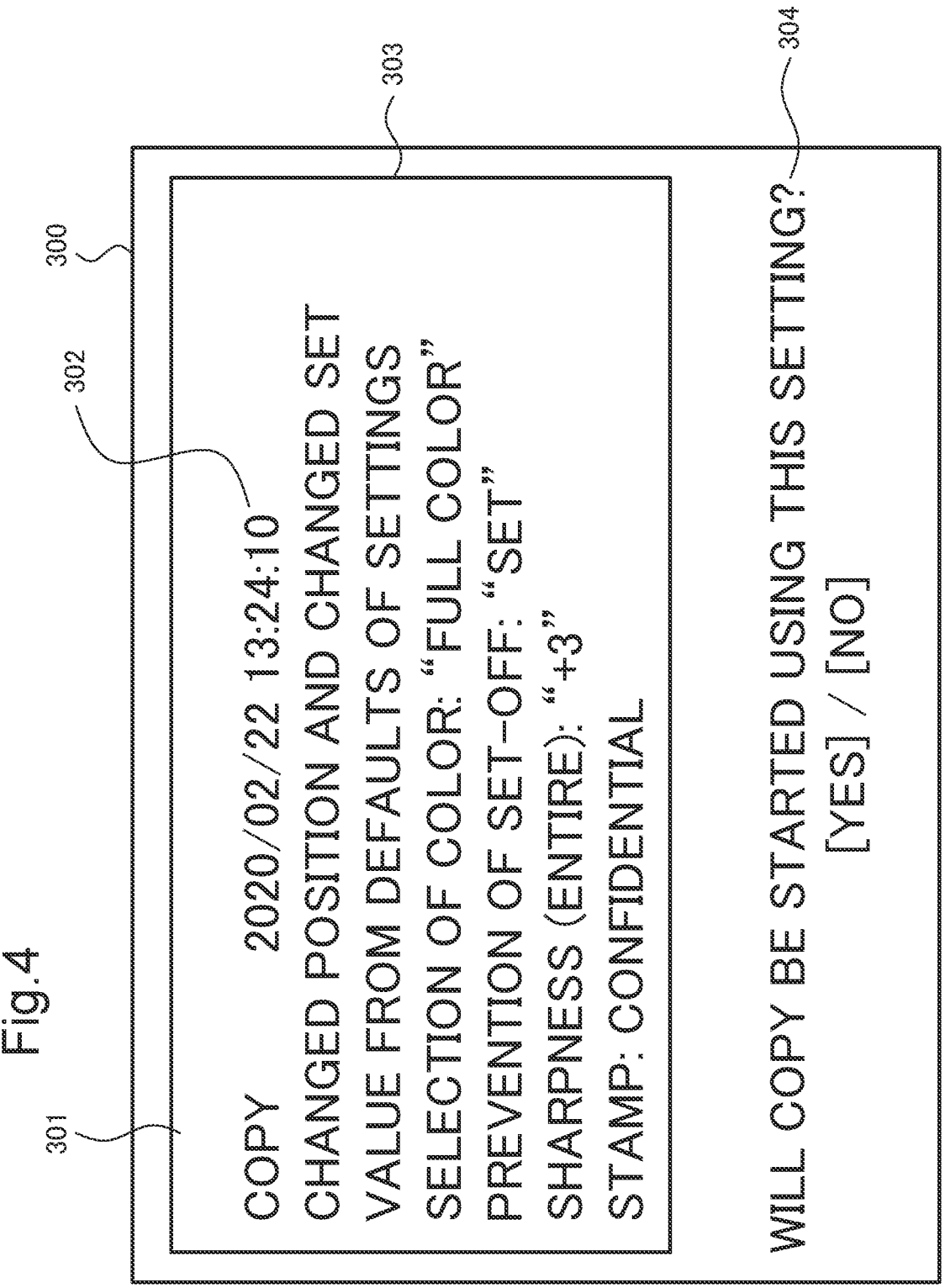
FIG. 4 is a diagram illustrating an example of a GUI displaying set values.

FIG. 4 illustrates an example of a GUI displaying a set value.

A GUI 300 displays a name 301 of a function to be executed, a date and time 302 at which the function was executed using the newest set value, a list 303 of newest set values set for a plurality of items, and a YES/NO button 304 indicating whether the function is to be executed using the set value.

A user inputs an instruction to start the copy function by touching the YES button 304 or by inputting voice when the user determines that the copy function is to be executed at the time of seeing the list 303 of newest set values, and inputs an instruction not to start the copy function by touching the NO button 304 or by inputting voice otherwise. The setting selector 115 determines whether an instruction to start the copy function has been input (Step S202).

When it is determined that an instruction to start the copy function has been input (YES in Step S202), the setting selector 115 selects the newest set value as a set value for executing the function. The function executor 116 executes the function (the copy function in this example) using the selected newest set value (Step S203). On the other hand, when it is determined that an instruction not to start the copy function has been input (NO in Step S202), the setting selector 115 is on standby for voice input (Step S204). That is, the setting selector 115 does not select any set value and displays a GUI for a voice operating process on the operation display device 140 (the touch panel) (Step S204), and the routine proceeds to a voice recognizing process (Step S101). FIG. 5 illustrates a third operation flow (a routine when a time-representing word indicating temporal farness is detected) in the image forming apparatus.

When the time-representing word "that" indicating temporal farness is detected (Step S117), the setting selector 115 determines a set value when the function detected in S105 was used by the user in the past. This process will be described below.

The word detector 113 detects a word indicating a date and time (a date-and-time indicating word) from the message analyzed in morphemes (Step S301). The date-and-time indicating word is a word indicating a date and/or a time. The date and time indicating word is, for example, "yesterday," or "this morning." For example, when a message is "Copy ABC.doc using that yesterday setting," the word detector 113 detects the date and time indicating word "yesterday" from the message analyzed in morphemes "Copy/ABC.doc/using/that/yesterday/setting" (YES in Step S301). On the other hand, when the message is "Copy ABC.doc using that setting," the word detector 113 does not detect a date and time indicating word from the message analyzed in morphemes "Copy/ABC.doc/using/that/setting" (NO in Step S301).

When the word detector 113 detects the date and time indicating word "yesterday," (YES in Step S301), the setting selector 115 selects a set value on the basis of the date and time indicated by the date and time indicating word. Specifically, the setting selector 115 first refers to the operation history storage device 123.

The operation history storage device 123 stores an operation history (operation log) for each user. For example, the operation history storage device 123 stores most recent ten operation histories for each function used by each user. The operation history includes a function name, date and time information, setting items and set values, and setting items and set values changed from defaults. For example, the setting items and the changed set values are a set value "full color" for an item "selection of color," a set value "set" for an item "prevention of set-off," and a set value "+3" for an item "sharpness (entire)."

The setting selector 115 determines whether the user used the function of the function name detected in Step S105 at the date and time indicated by the date and time indicating word with reference to the operation history storage device 123 (Step S302). In this example, the setting selector 115 determines whether the user used the copy function yesterday.

When it is determined that the user did not use the function at the date and time indicated by the date and time indicating word (the user did not use the copy function yesterday in this example) (NO in Step S302), the setting selector 115 displays a message such as "You did not use a designated function at a designated date and time" on the operation display device 140 or outputs the message by voice from the voice output device 150 (Step S303).

On the other hand, when it is determined that the user used the function at the date and time indicated by the date and time indicating word (the user used the copy function yesterday in this example) (YES in Step S302), the setting selector 115 determines that there is a high likelihood that a plurality of set values when the user used the function in a specific period including the date and time indicated by the date and time indicating word will be settings intended by the user and extracts the set values as candidates for the set value (Step S304). For example, the setting selector 115 extracts most recent ten set values (a plurality of set values used by the user in a specific period) including yesterday (the date and time indicated by the date and time indicating word) as candidates for the set value.

On the other hand, when the word detector 113 has not detected the date-and-time indicating word (NO in Step S301), the setting selector 115 determines whether the function of the function name detected in Step S105 was used by the user with reference to the operation history storage device 123 (Step S305). In this example, the setting selector 115 determines whether the user used the copy function in the past.

When it is determined that the function was not used by the user in the past (the user did not use the copy function in the past in this example) (NO in Step S305), the setting selector 115 displays a message such as "You did not use a designated function in the past" on the operation display device 140 or outputs the message by voice from the voice output device 150 (Step S306).

On the other hand, when it is determined that the user used the function in the past (the user used the copy function in the past in this example) (YES in Step S305), the setting selector 115 determines that there is a high likelihood that a plurality of set values when the user used the function in a most recent specific period will be settings intended by the user and extracts the set values as candidates for the set value (Step S307). For example, the setting selector 115 extracts most recent ten set values (that is, a period in which the most recent ten set values were used is the most recent specific period) as candidates for the set value.

The setting selector 115 displays a GUI 300 (see FIG. 4) displaying one of the ten candidates in the aforementioned example extracted in Step S304 or S307 on the operation display device 140 (Step S308). The setting selector 115 displays the set values sequentially from the set value with the highest frequency of use by the user as the GUI 300, for example, on the basis of the operation history (operation log) for each user stored in the operation history storage device 123.

A user inputs an instruction to start the copy function by touching the YES button 304 or by inputting voice when the user determines that the displayed copy function is to be executed at the time of seeing the GUI 300, and inputs an instruction not to start the copy function by touching the NO button 304 or by inputting voice otherwise. The setting selector 115 determines whether an instruction to start the copy function has been input (Step S309).

When it is determined that an instruction to start the copy function has been input (YES in Step S309), the setting selector 115 selects the set value displayed as the GUI 300 at this time point as a set value for executing the function. The function executor 116 executes the function (the copy function in this example) using the selected set value (Step S310).

On the other hand, when it is determined that an instruction not to start the copy function has been input (NO in Step S309) and when a set value (for example, a set value with a second highest frequency of use) other than the set value displayed as the GUI 300 is present out of the ten candidates determined in Step S304 or S307 (NO in Step S311), the setting selector 115 displays a GUI 300 indicating the set value (see FIG. 4) on the operation display device 140 (the touch panel) (Step S308). Thereafter, the routine proceeds to Step S309. When it is determined that an instruction not to start the copy function has been input (NO in Step S309), the setting selector 115 repeatedly performs the processes of Steps S311, S308, and S309.

When it is determined that an instruction not to start the copy function has been input for all the ten candidates for the set value displayed as the GUI 300 (YES in Step S311), the setting selector 115 displays a message such as "no more operation history remains" on the operation display device 140 or outputs the message by voice from the voice output device 150 (Step S312). That is, the setting selector 115 does not select any set value and displays a GUI for a voice operating process on the operation display device 140 (the touch panel), and the routine proceeds to the voice recognizing process (Step S101). The setting selector 115 maintains all the set values as defaults and does not change them.

3. CONCLUSION

The information processing apparatus, for example, the image forming apparatus, can execute a function (for example, a copy function or a scanner function) using a variable set value (for example, color setting of full color, gray-scale, or the like). An image forming apparatus in which a set value or a function can be designated by a user's voice is proposed.

When a user uses a demonstrative at the time of voice operation and the image forming apparatus cannot correctly determine the user's intention, there is concern that the image forming apparatus may not operate as expected by the user.

Therefore, for example, there is an information processing apparatus 1 that determines that a demonstrative indicates a certain item selected at that time point and executes a function designated by a message when a voice message is input in a state in which a user has selected the item on a display and a demonstrative in a predetermined list is included in the voice message. The information processing apparatus 1 can perform setting of only an item selected by a user but cannot determine a plurality of set values by one instruction. One setting item selected on the display can be changed but a plurality of setting items cannot be changed by one instruction as intended by a user. Past settings cannot be called to predict the meaning of a demonstrative from an item selected on the display by a user at that time point.

For example, there is an information processing apparatus 2 that determines the meaning of a demonstrative intended by a user and executes a function on the basis of operation histories in which a function executed according to a user's operation is correlated with text when the operation was performed and recorded. However, the information processing apparatus 2 can determine a user's intention from past log when voice operation is input, but cannot appropriately determine the meaning of a demonstrative from a user because a user's operation history has not remained when the user previously performed an operation by operating a panel.

On the other hand, according to this embodiment, when a message including a word indicating temporal nearness or farness (a time-representing word) "this," "its," or "that" and a keyword "setting" is input by a user at the time of voice operation on the image forming apparatus 100, a set value intended by the user is determined from a set value of the image forming apparatus 100 at this time point or set values used in the past by the user and a function is executed using the determined set value.

The image forming apparatus 100 determines that a set value intended by a user is the set value of the image forming apparatus 100 at that time point when the time-representing word "this" or "its" indicating temporal nearness is detected. On the other hand, when the time-representing word "that" indicating temporal farness is detected, the image forming apparatus 100 determines that the set value intended by the user is a set value included in the past operation history of the user and selects the set value intended by the user out of the set values in the past operation history of the user. In this way, the image forming apparatus 100 selects a set value in different ways according to a word indicating temporal nearness or farness (a time-representing word). Accordingly, it is possible to select a set value according to natural utterance of a user.

The image forming apparatus 100 can change a plurality of set values (that is, a group of set values) once unlike the information processing apparatus 1. The image forming apparatus 100 can call past settings when the time-representing word "that" indicating temporal farness is detected. Unlike the information processing apparatus 2, the image forming apparatus 100 can select a set value included in a past operation history of a user by voice input because an operation history remains even when the user inputs a set value to the image forming apparatus 100 in the past using the panel.

While embodiments and modified examples of the present disclosure have been described above, the present disclosure is not limited to the embodiments.

While the present disclosure has been described in detail with reference to the embodiments thereof, it would be apparent to those skilled in the art the various changes and modifications may be made therein within the scope defined by the appended claims.

What is claimed is:

1. An information processing apparatus comprising an operation display device and a control circuit,
the control circuit includes a processor and functions, through the processor executing an information processing program, as:
a morpheme analyzer configured to performs processing to decompose a message input by a user into the individual words consists of the message;
a word detector configured to detect a predetermined name indicating a function name from the individual words decomposed from the message by the morphological analyzer, and a predetermined time-representing word indicating temporal nearness or farness;
a setting selector configured to select a most recent set value previously set for a function indicated by the function name detected by the word detector as a set value for the function when the word detector has detected the time-representing word indicating temporal nearness, and configured to select a past setting value set for the function at a date and time indicated by a predetermined date-and-time-indicating word detected from the individual words decomposed by the word detector as the set value for the function when the word detector has detected the time-representing word indicating temporal farness; and
a function executor configured to execute the function using the set value selected by the setting selector,
wherein, when the word detector has detected the time-representing word indicating temporal farness and has not detected the date-and-time-indicating word, the setting selector is configured to extract a plurality of set values when the user used the function in a most recent specific period as candidates for the set value and configured to display the candidates for the set value on the operation display device,
and when an instruction to select a set value out of the candidates for the set value is input to the operation display device, the setting selector selects the set value designated by the instruction as a set value used to execute the function.

2. The information processing apparatus according to claim 1, wherein the setting selector is configured to sequentially extract, among the plurality of set values, the set values as the candidates from a set value with a highest frequency of use by the user.

* * * * *